Feb. 22, 1966     S. E. PERSSON     3,236,342
UNIVERSAL FASTENING DEVICE
Filed Feb. 26, 1963     3 Sheets-Sheet 1
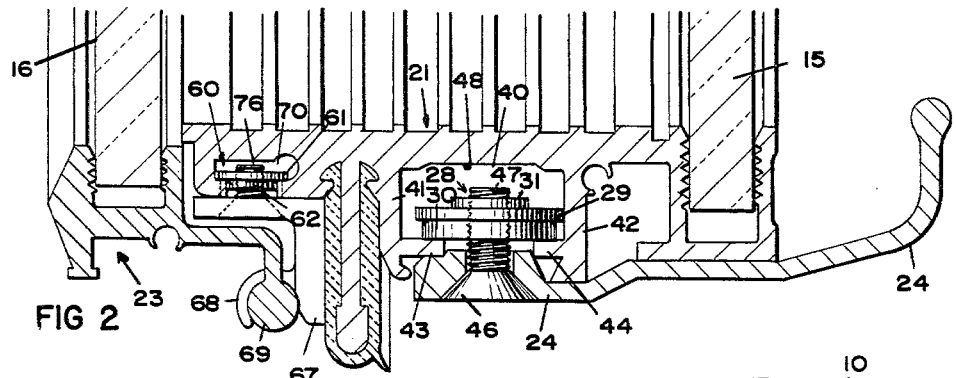
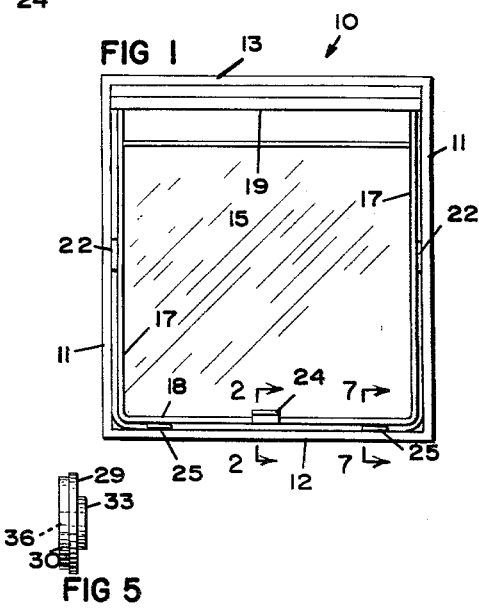
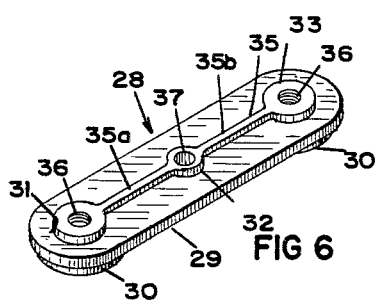
Sven-Eric Persson
INVENTOR
BY *Irwin D. Thompson*
ATTORNEY

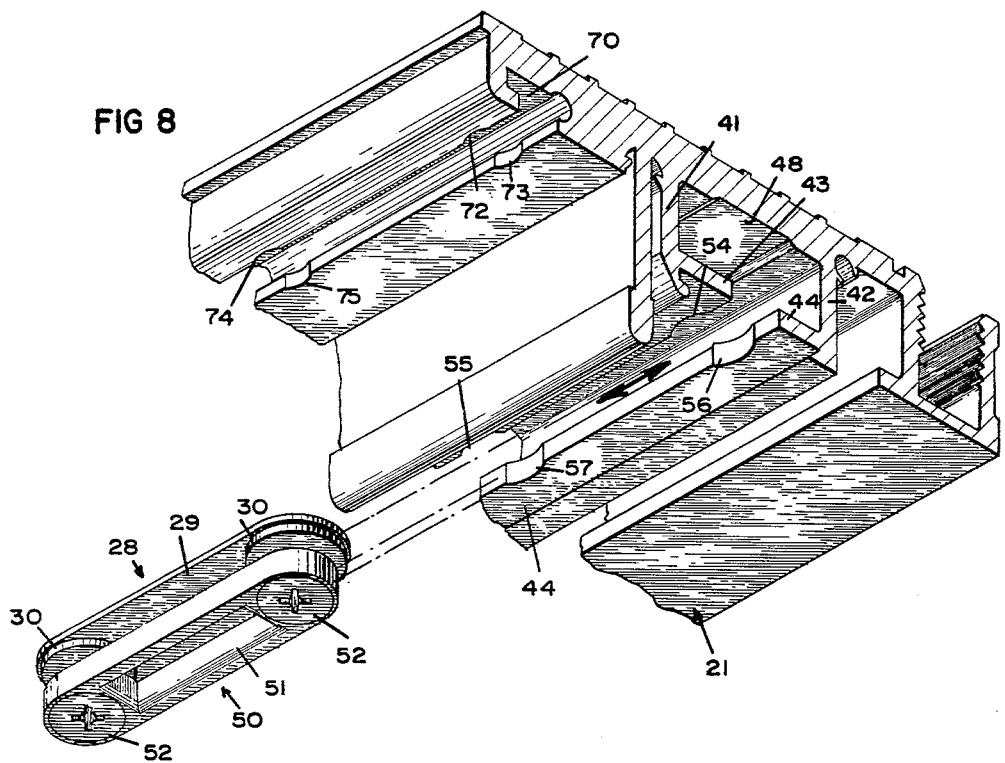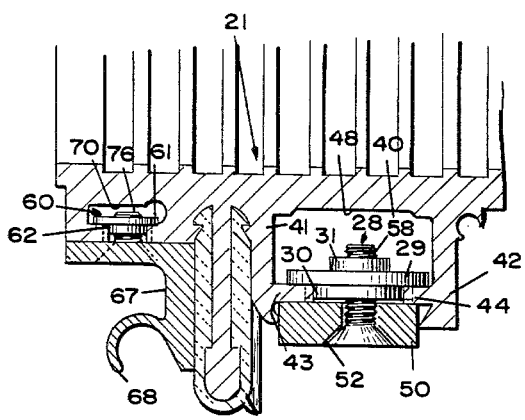

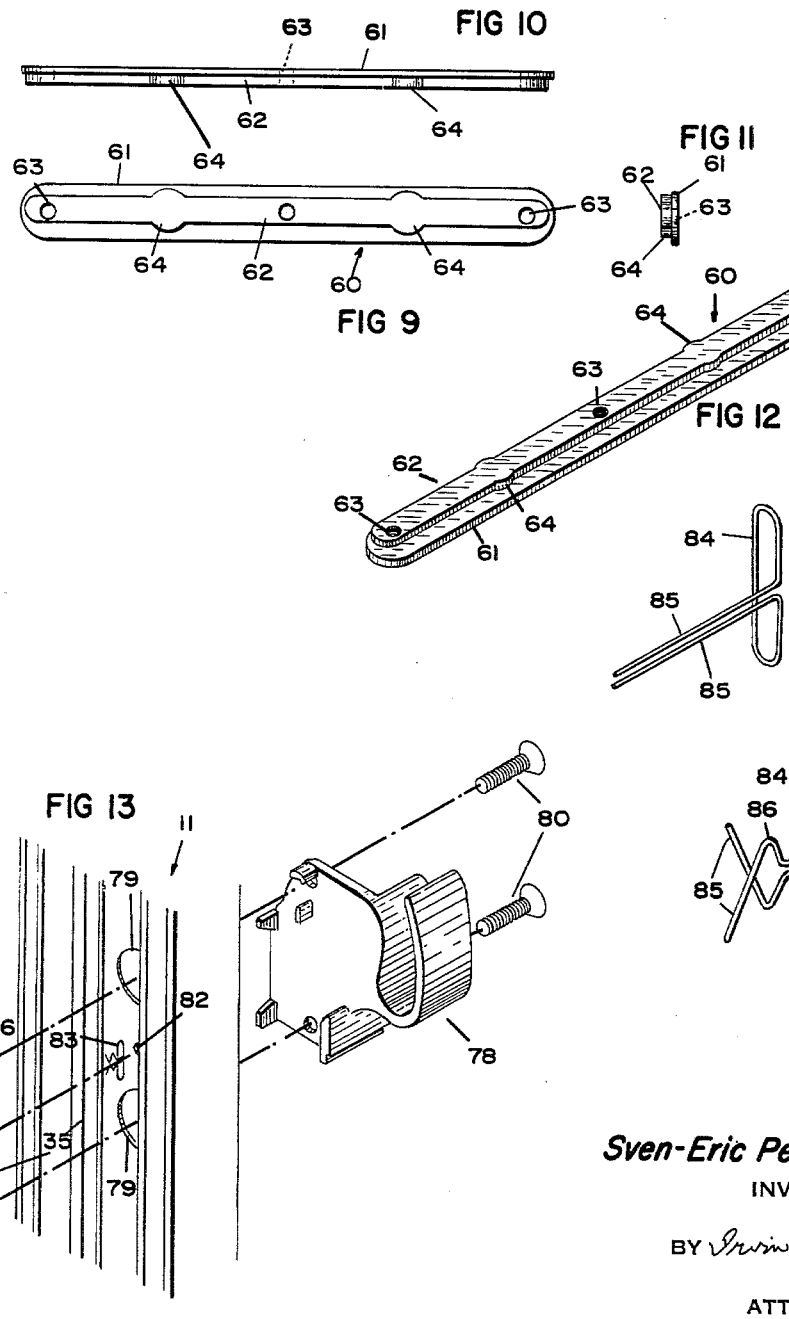

United States Patent Office 3,236,342
Patented Feb. 22, 1966

3,236,342
UNIVERSAL FASTENING DEVICE
Sven Eric Persson, Stow, Ohio
(Erikslustvagen 23, Malmo, Sweden)
Filed Feb. 26, 1963, Ser. No. 260,972
5 Claims. (Cl. 189—36)

The present invention relates to universal fastening or locating devices which are especially useful for rigidly mounting a component part of an assembly upon a base member intended to carry that part.

The invention more particularly concerns fastening or locating devices for holding hardware and various attached parts rigidly in place on extruded or formed sections of metal. Currently, many windows and doors are made of such extruded or formed metal sections, and in the course of their fabrication it often becomes necessary to attach a number of different hardware parts in predetermined locations upon the metal sections. These hardware parts must be located and retained in exact positions in relationship to each other in order to have the door or the window function properly. The universal fastening device according to the invention, which will be referred to hereinafter for brevity as a "nut plate," fulfills the aforementioned needs.

Heretofore the hardware parts have been mounted upon the metal sections by means of jigs and by measuring and then drilling holes into the sections to attach screws therein. But it always proved to be extremely difficult to obtain the required accuracy with these prior procedures. Moreover, in many instances the screws remained exposed after the window was assembled. The present invention concerns a fastening device which avoids all such disadvantages of the prior art, including inaccurate assembly, excessive consumption of time in fabrication, and the hazards and unsightly appearance of exposed screws or mounting members.

An object of this invention is to provide a new and improved fastening device for the mounting of component parts of an assembly.

Another object is to provide a fastening device of the type indicated which can be quickly and accurately located upon the associated base member, thus minimizing tolerances, eliminating errors in fabrication, and making the assembling operations easier.

A further object of the invention is to provide a fastening device that will be hidden from view in use, thereby improving the appearance and safety of the associated assembly, such as for example, a metal door or window.

Yet another object of the present invention is to provide a novel fastening device which will increase the distribution of the load imposed by the mounted part or parts, and which will produce a connection of greater rigidity and holding power.

A further object is to provide a fastening device which improves the functioning of the assembled product and reduces its cost.

An additional object is to provide a universal fastening device of the character set forth which itself has a simple but rugged construction, and which is efficient in use and in service.

The specific nature of the invention as well as various other objects, uses, and advantages thereof, will be apparent from the following description and from the accompanying drawings, while the novel features of the invention will be particularly pointed out by the appended claims.

In the drawings:

FIGURE 1 is a vertical elevational view by way of diagrammatic representation of a window with the frame and sash thereof assembled, as seen from the inner side of the window;

FIGURE 2 is a fragmentary vertical cross-sectional view taken on the line 2—2 in FIGURE 1, of the lower portion of the window assembly;

FIGURE 3 is a top plan view of one form of nut plate according to the invention;

FIGURE 4 is a side elevational view of the nut plate shown in FIGURE 3;

FIGURE 5 is an end view of the nut plate of FIGURE 3;

FIGURE 6 is a perspective view of the nut plate of FIGURE 3;

FIGURE 7 is a fragmentary cross-sectional view of the inner sash of the window, taken along line 7—7 in FIGURE 1;

FIGURE 8 is an exploded perspective view looking from below of a portion of the window sash showing how the universal fastening device is used to mount a lock keeper plate thereon;

FIGURES 9–12 are views, corresponding to FIGURES 3–6 respectively, of an alternate embodiment of the nut plate of the invention;

FIGURE 13 is an exploded perspective view through the window frame and one main hinge showing diagrammatically the mounting of one of the hinge components; and FIGURES 13a and 13b are perspective views of a spring retainer clip employed to hold the fastener of the invention temporarily in place in the assembly shown in FIGURE 13.

Referring now to the drawings, wherein like reference numerals designate like parts, FIGURE 1 shows a window 10 of the double glazed type, in which the frame has side walls 11, a bottom 12, and a top portion 13. This window frame is adapted to be mounted with its two sides 11 in vertical position in a window opening in the wall of a building. The sash is provided with two spaced glass panes 15 and 16 (FIG. 2) and has sides 17, bottom 18, and a top 19. This sash is preferably a double sash composed of an inner sash 21 carrying the inner pane 15 and an outer sash 23 furnished with the outer pane 16. The sash 21 is suspended from the sides 11 of the window frame by pivots or hinges 22 (not described in detail herein) for swinging movement within the frame through an angle of about 180° around a median horizontal axis. The sash 23 is hinged at its bottom to the inner sash 21 for swinging movement either therewith or in relation thereto. A manual operating handle 24 extends to the inside of the window, while a pair of locking handles 25 control locks which hold the sashes in the fully closed position or release them. The lock elements associated with handles 24 and 25 are attached to their respective base members in a manner to be described.

Inner sash 21 comprises a one-piece bar of rolled or extruded metal, preferably steel or aluminum, bent into a U-shaped configuration with rounded lower corners between its bottom 18 and the integral sides or legs 17, and a straight top metal rail extending across the ends of sides 17. The outer sash is of generally similar construction.

In order to combine the various frame and sash members described into an operable window, retaining them in correct positions and accommodating the pivotal movements of the separate sashes, certain interconnecting parts and operating hardware must be secured to the inner sash 21, whereas other similar parts will be attached to the window frame. The fastener or nut plate according to the invention serves to rigidly mount these interconnecting parts at specified points along the sash 21 and the frame.

Referring now to FIGURES 3–6 of the drawings, a first embodiment of the universal fastening device is illustrated therein. The nut plate is generally designated by reference 28, and comprises a flat body 29 with parallel sides and rounded or circular ends as shown. The main body 29 has a pair of circular bosses 30 projecting from one face, one boss concentric with each end as seen in FIGURES 3 and 4. On its opposite face, body 29 has a series of three smaller bosses 31, 32 and 33 which are also circular. The latter three bosses are aligned on the center line of plate or body 29, bosses 31 and 33 being coaxial with the bosses 30. A longitudinal rib 35 of rectangular or square cross-section has portions 35a and 35b which extend between boss 32 and the other bosses 31 and 33. A pair of threaded or tapped holes 36 are provided through the nut plate 28 at its opposite ends along the axes of bosses 30, 31 and of bosses 30, 33. A center hole 37 for a purpose to be described passes through body 29 and boss 32.

The nut plate 28 is arranged to be placed in grooves formed in the extruded metal sections, such as the inner sash 21. The nut plate may assume a number of different positions as described below, depending on the particular part being fastened. FIGURE 2 is a partial cross-section across the lower center of the window (along section line 2—2 in FIGURE 1) which illustrates the attachment of operating handle 24 to the inner sash 21. This handle is useful for pivoting sash 21, and sash 23 carried thereby, in order to open the window or for pivoting the sashes through 180° in order to gain access to the outer glass pane 16. The sash 21 contains a continuous groove or channel 40 extending around the outside of the U-shaped section. Channel 40 is formed by vertical ribs or walls 41 and 42 having the integral perpendicular shoulders or flanges 43 and 44 thereon.

Nut plate 28 is inserted into groove 40 so that its projecting bosses 30 bear against the inner surfaces of the flanges 43 and 44 at the desired location along the groove. The nut plate may be inserted through an access hole or from either corner of sash 21 and slid along inside channel 40 to the correct location, or alternately, it may be slipped directly in place into the channel on an angle. The handle 24 having two countersunk holes 46 in the region of its inner end (FIG. 2) is placed across the longitudinal slot between channel shoulders 43 and 44 so that its holes 46 align with threaded holes 36 in the nut plate 28. A pair of flat head machine screws 47 passing through holes 46 and engaging in threaded holes 36 serve to clamp handle 24 and nut plate 28 together upon the flanges or shoulders 43, 44. With the screws loosened slightly, the unit comprising handle 24 and nut plate 28 may be adjusted along the length of the channel to the exact location required. When the screws 47 are then tightened, the handle 24 is effectively and very firmly attached to the window sash.

In practice, the foregoing assembling operation preferably is done with the window turned upside down, so that the nut plate initially rests by means of bosses 31, 32 and 33 upon the bottom 48 of groove 40. The relationship between the depth of groove 40, the length of screws 47, and the maximum thickness of nut plate 28 is made such that a standard length screw will pick up the nut plate from its position on the bottom 48 and lift it to the clamping position against flanges 43, 44 while screws 47 are threaded into the tapped holes 36. This feature eliminates the necessity of providing separate means to hold up the nut plate in final position in order to insert the screws 47, while still allowing the channel to be deep enough to receive the nut plate when inserted on an angle therein.

FIGURES 7 and 8 illustrate another manner of using the nut plate, wherein the channel 40 has been provided with notches adapted to fit the projecting bosses 30 upon nut plate 28. The arrangement of FIGURES 7 and 8 may be restored to wherever the attached part must withstand large external forces, and especially forces in the direction of the double arrow in FIGURE 8.

The particular example shown in FIGURES 7 and 8 refers to a keeper plate 50 which is one principal component of a locking mechanism (not shown) that serves to hold the window sash in the closed position within the frame. The keeper plate is provided with a rectangular opening 51 suitable to receive therein a cam member on a shaft which is connected with the locking handles 25. It also contains countersunk mounting holes 52 near its ends. The two keeper plates 50 required are mounted upon the same channel 40 with handle 24, one on each side thereof and in line with the handles 25. The cross-section of FIGURE 7 is taken at the center of the handle 25 on the right side in FIGURE 1.

At the places along channel 40 where the keeper plates must be located, the flange or shoulder 43 will have been provided with curved notches 54 and 55 during manufacture of the inner sash 21. Shoulder 44 likewise has a pair of similar notches 56 and 57 opposite the notches 54 and 55. All of the notches required in a base member such as sash 21 may be pre-punched simultaneously and thus located with great accuracy in a large die or special machine during manufacture of the part 21. The notches 54–57 are punched in a form that will fit snugly around the peripheries of bosses 30 on the nut plate.

In assembling a nut plate 28 will be inserted into channel 40 and positioned on the bottom 48 of the channel so that its bosses 30 are lined up with and face the notches 54–57. Keeper 50 then fits against the underside of flanges 43, 44 (seen in FIG. 8) with its mounting holes 52 aligned with tapped holes 36. The nut plate 28 and keeper plate 50 are then in the relative position illustrated at the lower part of FIGURE 8, but with the nut plate inside channel 40 while the keeper plate rests upon the outer surfaces of flanges or shoulders 43, 44 and covers notches 54–57. Two machine screws 58 (FIGURE 7) are fitted through holes 52 and threaded into the tapped holes 36 of the nut plate, drawing the latter upward.

When screws 58 are fully tightened, the bosses 30 enter the notches 54, 56 and 55, 57, the keeper plate and the nut plate being rigidly clamped together against the shoulders or flanges 43, 44 with the flat body 29 of plate 28 abutting the inner surfaces of the flanges (FIGURE 7). With the bosses 30 located in the punched out spaces 54–57, nut plate 28 will be firmly locked in position holding the hardware or attached part rigidly in its exact position, so that even large forces upon the hardware cannot cause the nut plate to slide or move. Moreover, with the universal fastening device of this invention, it becomes possible to pre-punch all cooperating notches in an automatic die machine at the same time so that these provisions for the nut plate may be located easily, with improved accuracy and precision. As a result, errors in assembly are eliminated and tolerances are minimized, which improve the functioning and appearance of the product as well as reducing its costs and making the assembling operations easier.

Another embodiment of a universal fastening device is shown by FIGURES 9–12 of the drawing. This modified nut plate is designated by numeral 60. It is composed of a flat rectangular base 61 which has its ends rounded. A narrower longitudinal part 62 extends above one face of base 61 and is provided with three tapped holes 63 which pass clear through the nut plate 60. A pair of circular bosses 64 are formed along the part 62 intermediate the threaded holes.

FIGURES 7 and 8 illustrate the employment of nut plate 60 to mount a hinge plate 67 which has one or more hinge elements 68 that cooperates with a circular bearing rim 69 (see FIGURE 2) running along one edge of the outer sash 23. The parts 68 and 69 together comprise a separable hinge connecting the sashes 21 and 23 for relative swinging apart movement as mentioned hereabove without separation and enabling easy separation of the two sashes. Besides the channel 40, the inner sash also contains a smaller longitudinal channel 70 to receive nut plate 60 in the same general manner as nut plate 28 is received in channel 40. Channel 70 is prepunched with notches 72–75 made in its outer flanges, which notches fit around the outer edges of projecting bosses 64 when fastening nut plate 60 is locked in place. The hinge plate 67 and the nut plate 60 are urged together against the channel shoulders with the aid of machine screws 76 passing through holes in plates 67 and engaging the threaded holes of the nut plate. Again, the depth of groove or channel 70, the thickness of the nut plate 60, and the length of screws 76 may be so related that insertion and tightening of the screws will pick up and lift the nut plate automatically from the bottom of the channel.

The holes for the screws in the nut plates, such as holes 36, can be tapped in the usual manner with a thread matching that of the screw. On the other hand, if the nut plate is composed of a cast material, the holes can be cast square and when a screw is inserted therein, it will cut its own thread in the square hole while it is being tightened. The reason for providing a square hole rather than a round one is so that the material pushed out by the thread in the screw will be able to enter the corners of the square hole. After the screw is inserted and has finished cutting the threads, the hole will be approximately round.

While the nut plates have been described above in connection with use inside a channel having a ⌐⌐-shaped cross-section, they are not limited to such situations. In fact, nut plate 28 does not require a channel in the base member at all. FIGURE 13 illustrates the use of nut plate 28 to fasten a vent hinge leaf body 78 to the left side wall 11 of the fixed window frame. The body 78 comprises one main component of the pivots or hinges 22 mentioned heretofore. In this instance the nut plate 28 is simply placed in contact with a flat wall portion of the side 11 which has been provided with a pair of holes 79 of correct size and spacing to receive the bosses 30 therein. The vent hinge body 78 contacts the wall 11 on the side opposite to nut plate 28 and is clamped firmly against wall 11 by means of two machine screws 80 which are threaded into holes 36 of the nut plate. Where the nut plate is to be mounted on a vertical wall, some means must be provided to hold it in position until the screws 80 can be engaged. It is for this purpose that the central hole 37 is provided in plate 28. A cooperating hole 82 is provided in wall 11 between holes 79, and a simple retainer clip 83 made from wire is used to hold the nut plate in position. The wire clip initially has a T-shaped configuration with a cross-bar 84 and straight double legs 85—85 (see FIGURE 13a). The nut plate is positioned with its bosses 30 fitted inside holes 79, whereupon holes 37 and 82 will be aligned. The clip 83 is inserted by means of the legs 85—85 from the back side of wall 11 through holes 82 and 37. The legs 85—85 can then be bent as shown at 86 in FIGURE 13b to hold the nut plate between part 84 bearing against wall 11 on one side and parts 86 of the clip bearing upon the opposite side of the nut plate. The wire clip 83 holds the plate 28 temporarily until the screws 80 are inserted, but the clip may be left in place if desired. It will thus prevent the nut plate from moving out of position if the screws have to be removed later.

It will be understood that various changes in the details, materials, steps and arrangements of parts, which have been herein described and illustrated in order to explain the nature of the invention, may be made by those skilled in the art within the principle and scope of the invention as defined by the appended claims.

I claim:

1. A universal fastening device for mounting a separate component part of an assembly upon a base member, comprising a fastening device comprising a body, at least one protrusion upon said body, said fastening device having an internally screw-threaded screw-receiving hole passing through said body, a base member provided with a straight elongated U-shaped channel having flanges that extend toward each other, said fastening device being disposed within said channel, and screw means engaged within said hole clamping said component part and said fastening device together with the body of said fastening device clamped flat against the inner surfaces of said flanges so that said component part is held firmly in its exact position upon said base member.

2. A universal clamping device comprising a body, at least a pair of arcuate protrusions upon one surface of said body and integral therewith, a rib extending longitudinally upon the opposite surface of said body, at least a pair of tapped holes extending transversely through said protrusions, said body, and said rib, and a central hole passing through said body and said rib only.

3. A universal fastening device for holding a component of an assembly upon a base member thereof, comprising a fastening device comprising a flat body, at least one protrusion upon said body, said body having a tapped hole passing through both said protrusion and said body, a base member containing a channel with outer flanges that extend toward each other, each flange having at least one notch, said notches opening toward each other in pairs, said fastening device being disposed within said channel with its protrusions fitted within said flange notches, and screw means passing through said mounting holes and engaging with each tapped hole for clamping said component and said fastening device together rigidly against said flanges.

4. A fastening device according to claim 3, wherein each tapped hole is initially unthreaded and of square cross-section, and said screw means are self-tapping and cut their own threads upon being inserted into said square hole.

5. A universal fastening device for rigidly mounting a component part of an assembly upon a base member thereof, comprising a fastening device comprising an elongated body, at least one arcuate protrusion upon said body, said body having a screw-receiving hole extending transversely through both said protrusion and said body, a base member having a flat mounting wall portion which contains at least one aperture therein proportioned to fit around said protrusion, said fastening device contacting one side of said wall portion with its protrusion disposed within said aperture, screw means engaged within said hole for clamping said component part contacting the other side of said wall portion and said fastening device together so that said component part is held firmly and accurately in place upon said base member, said fastening device having a central opening therein, and a retainer clip which passes through an opening in said wall portion and through said central opening to hold said fastening device in place when said screw means are removed.

References Cited by the Examiner

UNITED STATES PATENTS

| 1,986,981 | 1/1935 | Ross | 189—36 |
| 2,101,287 | 12/1937 | Tinnerman | 189—36 |
| 2,125,396 | 8/1938 | Olshevsky | 189—36 |
| 2,941,235 | 6/1960 | Schwartz et al. | 16—116 |

FOREIGN PATENTS 139,821  9/1921  Great Britain.

HARRISON R. MOSELEY, *Primary Examiner.*

REINALDO P. MACHADO, *Examiner.*